United States Patent
Erath

[11] Patent Number: 6,049,511
[45] Date of Patent: Apr. 11, 2000

[54] HIGH SENSITIVITY FIBER OPTIC HYDROPHONE

[75] Inventor: Louis W. Erath, Abbeville, La.

[73] Assignee: GeoSensor Corporation, Houston, Tex.

[21] Appl. No.: 09/306,740

[22] Filed: May 7, 1999

[51] Int. Cl.[7] .................................................. H04R 17/00
[52] U.S. Cl. .......................... 367/149; 367/163; 367/174
[58] Field of Search .................................... 367/149, 163, 367/174; 310/337

[56] References Cited

U.S. PATENT DOCUMENTS 4,959,539  9/1990  Hofler et al. ......................... 250/227.19
5,390,155  2/1995  Lea .......................................... 367/149
5,394,379  2/1995  Weichart et al. ....................... 367/163
5,637,865  6/1997  Bullat et al. ....................... 250/227.14

Primary Examiner—Ian J. Lobo
Attorney, Agent, or Firm—Gunn & Associates, P.C.

[57] ABSTRACT

A fiber optic hydrophone structure comprises a casing around which is wound an optical fiber. The casing includes complementary top and bottom diaphragm members that mesh together and which are separated by a spacer ring. The spacer ring is tapered to knife edges which abut the inside surfaces of the top and bottom diaphragm members. The spacer thus acts as a fulcrum when a seismic signal causes motion of the diaphragms.

11 Claims, 4 Drawing Sheets

HIGH SENSITIVITY FIBER OPTIC HYDROPHONE

FIELD OF THE INVENTION

The present invention relates generally to the field of hydrophones and, more particularly, to a fiber optic hydrophone of great sensitivity that is inexpensive to manufacture.

BACKGROUND OF THE INVENTION

Fiber optic hydrophones that respond to acoustic signals have shown increasing promise for the acquisition of data, particularly in seismic exploration and other applications. Known fiber optic hydrophones used such applications are based on altering the optical path length of an optical fiber as a function of the acoustic signal. Systems which employ such hydrophones may also include interferometers which detect changes in optical phase or spectrometers which detect spectral shifts. For example, certain fiber optic interferometric sensors respond to underwater perturbations such as acoustic wave fronts by varying the effective length of the fiber optic filament in response to the perturbation.

In such applications, optical fibers are made sensitive to these acoustic waves. An optical fiber exposed to such phenomena changes the medium through which a light or infrared beam passes that is guided by the fiber. One well known technique to implement this concept involves winding an optical fiber around a compliant mandrel. When subjected to an acoustic signal, the geometry of the mandrel varies in direct response to the acoustic signal, and consequently the optical path length of the optical fiber wound around the mandrel.

While effective in changing the effective optical path length of the optical fiber in response to the phenomenon to be measured, these known structures are not easily incorporated into a seismic cable due to their size and geometry. Other known structures, referred to in the art as "clamshells", were designed specifically with size and geometry in mind, but would be improved if they only had greater sensitivity to the acoustic signal.

Thus, there remains a need for a sensor that is responsive to variations in pressure, in the form of a seismic signal, using variations in the stress on a fiber optic element. Such a sensor should be robust, highly sensitive, and easily manufactured.

SUMMARY OF THE INVENTION

The present invention addresses these and other needs in the fiber optic hydrophone art by providing a new hydrophone structure that comprises primarily a hydrophone casing around which is wound an optical fiber. The casing includes complementary top and bottom diaphragm members that mesh together and which are separated by a spacer ring. The spacer ring is tapered to knife edges which abut the inside surfaces of the top and bottom diaphragm members. The spacer thus acts as a fulcrum when a seismic signal causes motion of the diaphragms.

Extending from the periphery of each diaphragm member is a plurality of tabs or fingers, which mesh with the tabs or fingers of the complementary diaphragm member. The tabs flex outwardly when the diaphragm members are compressed toward each other in response to a pressure signal. An optical fiber is wound one or more times around the tabs, and thus the fiber is stretched when the tabs extend outwardly. The tabs may include an annular groove for placement of the optical fiber.

The casing may be configured as a low profile cylinder, or it may be configured as a low profile parallelepiped. In either case, adhesive tape may be placed at the point where the spacer ring contacts the diaphragm member to seal the casing.

Thus, the structure provides a hydrophone that is both compact and robust to the harsh underwater environment. The structure also provides a fiber optic hydrophone that provides greater sensitivity than previous known structures. It is inexpensive to manufacture, and is easily configured to be installed in a variety of applications, particularly in a towed hydrophone array for seismic exploration.

The present invention thus provides a new hydrophone element and structure, as well as a method of making the hydrophone structure. The present invention further provides a novel hydrophone array employing such hydrophone elements. These and other features of the present invention will be readily apparent to those of skill in the art from a review of the following detailed description along with the accompanying drawings.

DETAILED DESCRIPTION OF A PREFERRED EMBODIMENT

Figure 1:
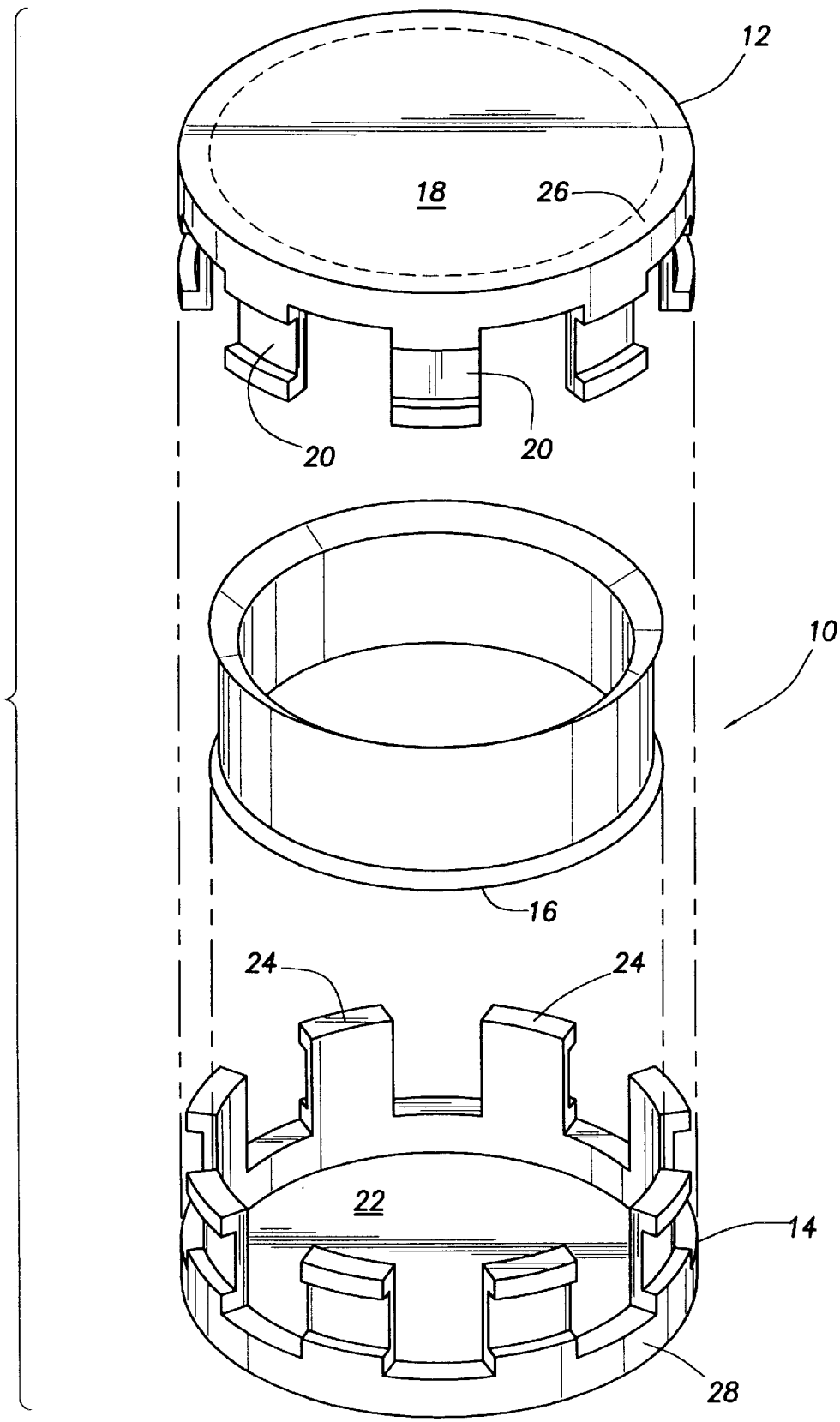
FIG. 1 is a perspective exploded view of a hydrophone casing of the present invention showing top and bottom diaphragm members and a spacer ring.
Figure 5:
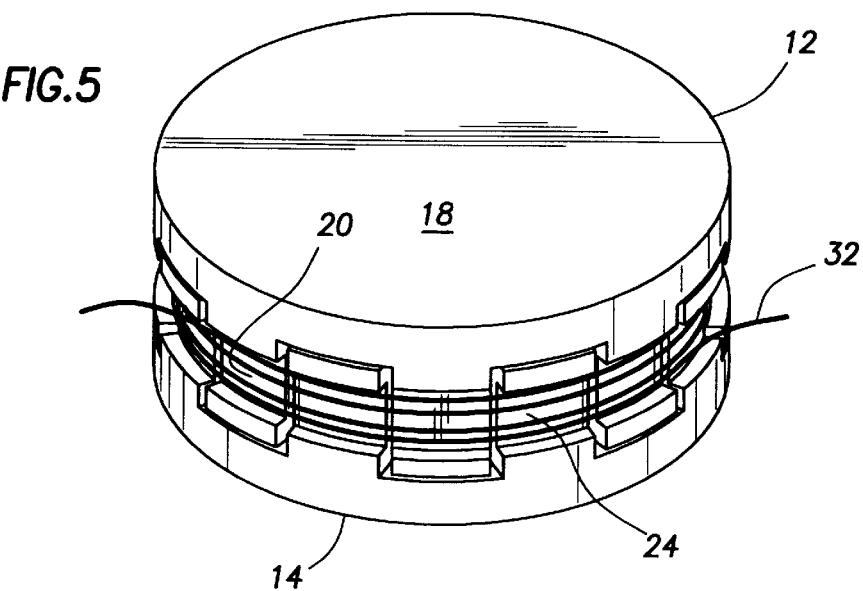
FIG. 5 is a perspective view of casing of this invention with one turn of an optical fiber taken around the casing.
Figure 7:
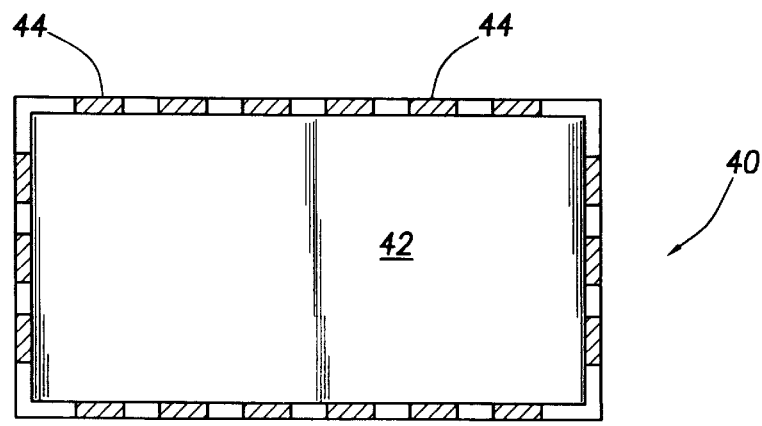
FIG. 7 is a top section view of a diaphragm member illustrating a rectangular configuration.

FIG. 1 depicts the components of a casing 10 of this invention. The casing 10 comprises a top diaphragm member 12, a bottom diaphragm member 14, and a spacer ring 16. The top diaphragm member 12 includes a circular diaphragm 18 (which may also be rectangular as shown in FIG. 7) and a plurality of downwardly extending tabs 20. The bottom diaphragm member 14 includes a diaphragm 22 and a plurality of upwardly extending tabs 24. The tabs 20 and 24 mesh together, thus the spacing between tabs must be at least a little wider than the width of a tab, as shown in FIG. 5.

On the underside of the diaphragm 18 is a ring of adhesive, such as an adhesive tape 26. A similar ring of tape 28 is adhered to the inside of the diaphragm 22. When the casing 10 is assembled, the adhesive tape joins the top and bottom diaphragm members and ring into a sealed element.

Figure 2:
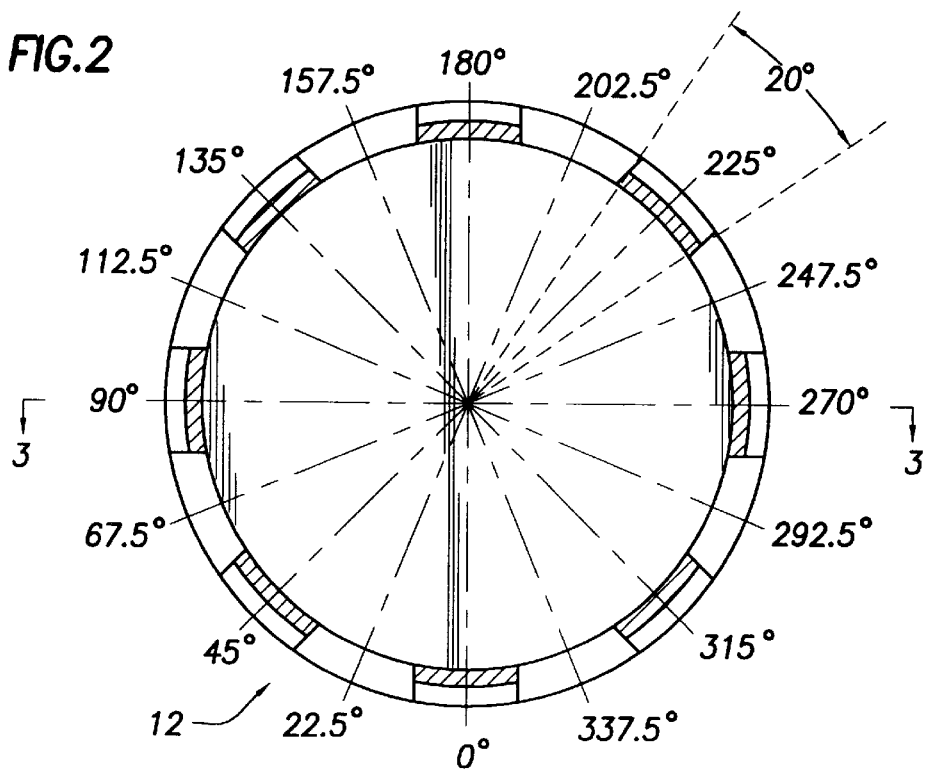
FIG. 2 is a top section view of a diaphragm member illustrating a plurality of tabs.

FIG. 2 depicts the layout of a preferred diaphragm member 12 and the tabs and spaces between the tabs. The bottom diaphragm will have a similar layout so that the diaphragm members mesh together. It has been found that the more tabs are included, the more responsive the hydrophone of the invention is. This is because of the curvature of the tabs. Fewer tabs means greater curvature, and thus greater resistance to a bending moment in response to a pressure signal. FIG. 2 illustrates 8 such tabs, although more or fewer tabs may be employed within the scope of this invention.

Figure 3:
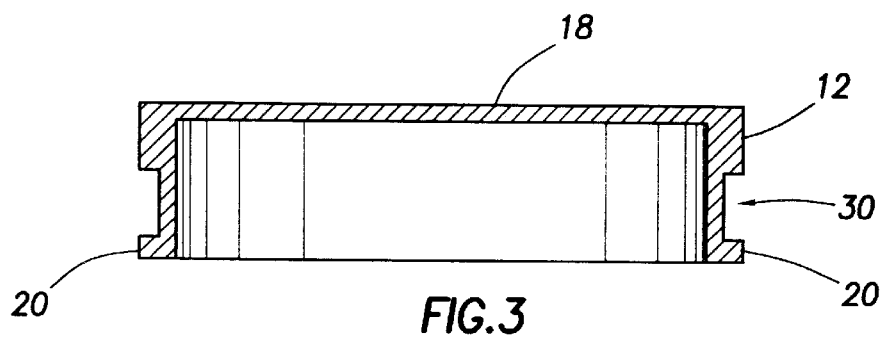
FIG. 3 is a side section view of a diaphragm member.

FIG. 3 depicts a side section view of a top diaphragm member 12. The diaphragm member 12 includes a diaphragm 18 and tabs 20. In this embodiment, each tab 20 includes an annular groove 30 to receive a winding of optical fiber 32 (FIGS. 4 and 5).

Figure 4:
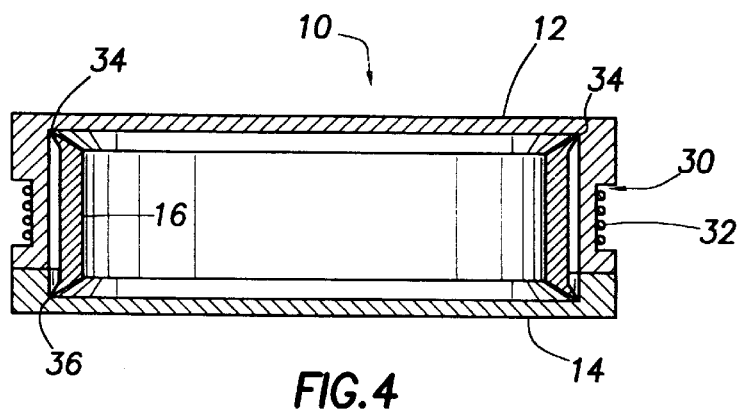
FIG. 4 is a side section view of the casing with top and bottom diaphragm members joined together around a spacer ring.
Figure 6:
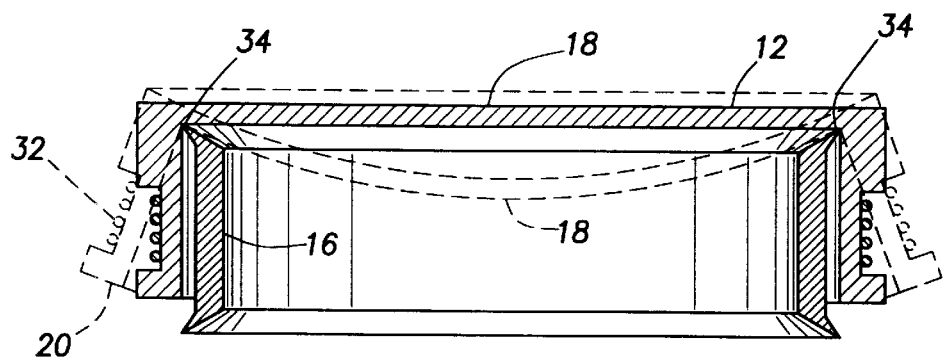
FIG. 6 is a side section view of a top diaphragm member with the effect of a pressure signal illustrated in phantom to show the stretching of an optical fiber.

FIG. 4 shows the casing 10 assembled with the upper diaphragm member 12, the lower diaphragm member 14 and the spacer ring 16, all joined together with an optical fiber 32 wrapped around the casing. The section view of the spacer ring 16 shows that the spacer is tapered to a circular knife edge 34 and a knife edge 36 so that the inside surfaces of the diaphragms rests on these knife edges. The knife edges 34 and 36 perform as fulcra about which the diaphragms pivot under the influence of a pressure signal. This operation is illustrated in FIG. 6, which is shown with exaggerated flexure to illustrate the principal of operation.

As the diaphragm 18 flexes down under the influence of a pressure increase, the diaphragm is held in place by the knife edge 34, and thus the tabs 20 rotate outwardly, stretching the fiber 32. This action provides mechanical advantage for the lever action, causing greater stretch of the fiber for a given movement of the diaphragm than in previous fiber optic hydrophones.

FIG. 7 depicts a diaphragm element 40 which is rectangular in configuration. In this case a diaphragm 42 is also rectangular, and a plurality of tabs 44 are flat. The principle of operation of this embodiment is the same as previous described.

Figure 8:
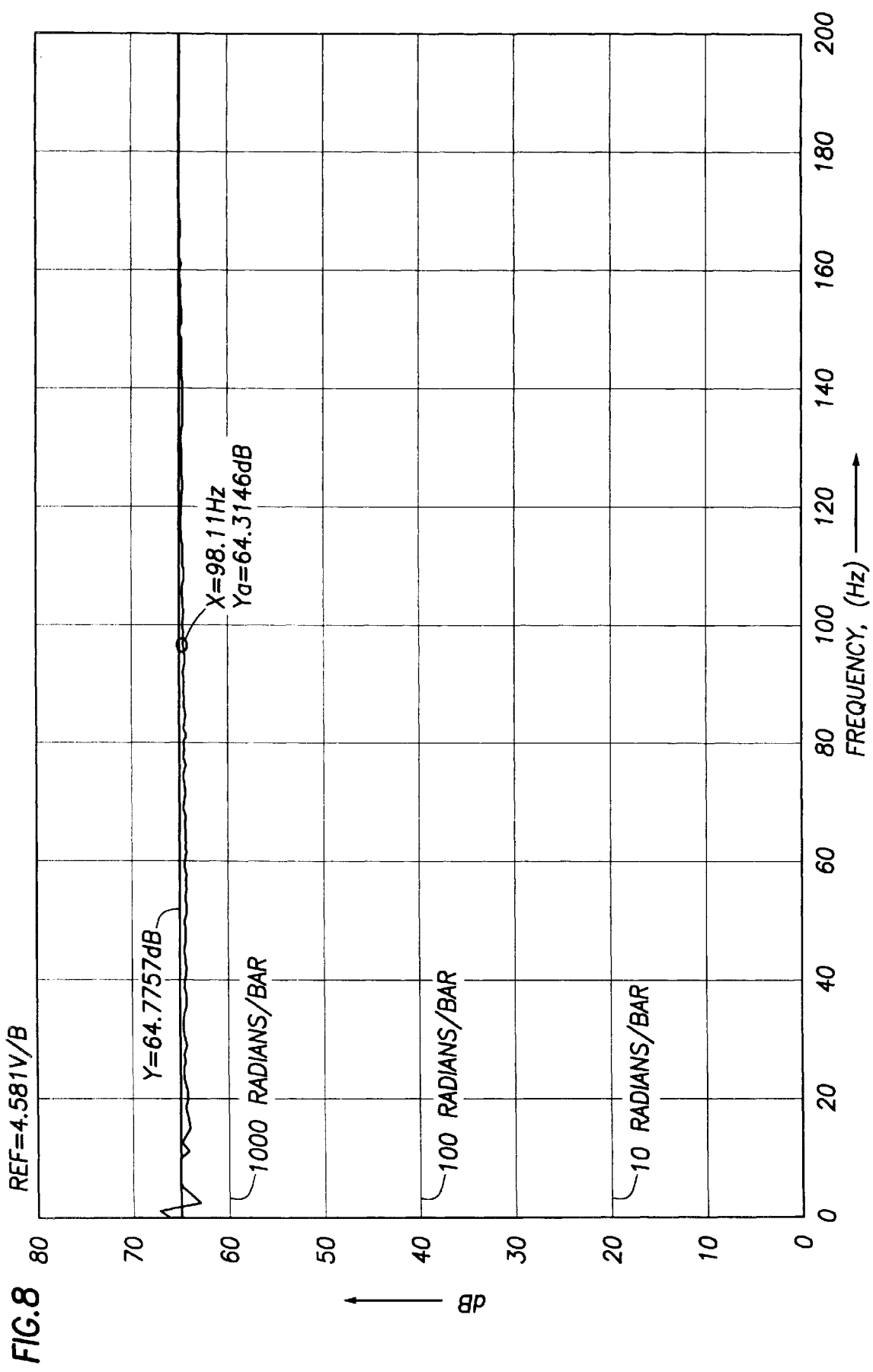
FIG. 8 is a plot of the test results of a hydrophone constructed in accordance with this invention.

Finally, FIG. 8 depicts test results of a hydrophone constructed in accordance with embodiment illustrated in FIGS. 1 through 6. Test results were obtained with a Hewlett Packard 3562A spectrum analyzer and the plot was made with a Techtronix 1417 plotter.

The test structure was made of brass, although the device may be made of any appropriate material. It may be die cast metal, but for product volumes is preferably stamped from sheet metal. It may also be molded from plastic. The test casing was a total of 1.1" in diameter, and a total of 0.325" thick. For the test apparatus, 9 turns of fiber were used around the casing to determine sensitivity. It should also be noted that another advantage of this structure is that readily available, inexpensive optical fiber is well adapted for this application. No special fiber is required.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A hydrophone comprising:
   a. a top diaphragm element having a first diaphragm and a plurality of top tabs extending from the first diaphragm;
   b. a bottom diaphragm element having a second diaphragm and a plurality of bottom tabs extending from the second diaphragm, the bottom tabs configured to fit between the top tabs;
   c. a spacer between the top diaphragm element and the bottom diaphragm element; and
   d. an optical fiber wound around the top and bottom tabs.

2. The hydrophone of claim 1 wherein the top tabs extend perpendicularly from the first diaphragm and the bottom tabs extend perpendicularly from the second diaphragm.

3. The hydrophone of claim 1, further comprising an adhesive between the first diaphragm and the spacer and further comprising an adhesive between the second diaphragm and the spacer.

4. The hydrophone of claim 1, wherein the first and second diaphragms are circular.

5. The hydrophone of claim 1, wherein the first and second diaphragms are rectangular.

6. The hydrophone of claim 1, wherein the spacer defines a first knife edge in contact with the first diaphragm and a second knife edge in contact with the second diaphragm.

7. The hydrophone of claim 1, wherein each of the top and bottom diaphragm elements is die stamped from sheet metal.

8. The hydrophone of claim 1, each of the tabs has a groove formed therein to receive the optical fiber.

9. The hydrophone of claim 1, wherein each tab defines a width of the tab that is less that a space between adjacent tabs.

10. The hydrophone of claim 1, wherein the optical fiber is wound around the top and bottom tabs a plurality of times.

11. A method of making a fiber optic hydrophone comprising the steps of:
   a. forming a top diaphragm element having a first diaphragm and a plurality of top tabs extending from the first diaphragm;
   b. forming a bottom diaphragm element having a second diaphragm and a plurality of bottom tabs extending from the second diaphragm;
   c. placing a spacer element between the top and bottom diaphragm elements;
   d. meshing the top and bottom tabs so that the top and bottom diaphragm elements fit together; and
   e. winding an optical fiber around the top and bottom tabs.

* * * * *